(12) United States Patent
Ma

(10) Patent No.: US 6,305,364 B1
(45) Date of Patent: Oct. 23, 2001

(54) INTERNAL COMBUSTION ENGINE AND OPERATION THEREOF

(75) Inventor: Thomas Tsoi Hei Ma, Essex (GB)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/563,645

(22) Filed: May 2, 2000

(30) Foreign Application Priority Data

Apr. 30, 1999 (GB) .................................................. 9909872

(51) Int. Cl.$^7$ .................................................. F02M 25/07
(52) U.S. Cl. .............................. 123/568.14; 123/90.15; 701/104
(58) Field of Search .................. 123/568.13, 568.14, 123/90.15–90.18, 547, 553; 701/104

(56) References Cited

U.S. PATENT DOCUMENTS

| 5,224,460 | * | 7/1993 | Havstad et al. | ................. | 123/568.14 |
| 5,806,012 | * | 9/1998 | Maki et al. | ............................. | 701/104 |
| 6,131,554 | * | 10/2000 | Ito et al. | .............................. | 123/90.15 |
| 6,192,858 | * | 2/2001 | Nieberding | ........................ | 123/568.14 |

FOREIGN PATENT DOCUMENTS

| 0 594 462 A | 4/1994 | (EP) . |
| 2 703 107 A | 9/1994 | (FR) . |
| 2 313 623 | 12/1997 | (GB) . |
| 04091358 | 3/1992 | (JP) . |
| 10103094 | 4/1998 | (JP) . |

* cited by examiner

Primary Examiner—Erick Solis
(74) Attorney, Agent, or Firm—Carlos L. Hanze

(57) ABSTRACT

An engine is described that has a variable valve timing system. Under low and medium load operation of the engine, the valve timing system sets an prolonged valve overlap period and fuel is injected predominantly during this prolonged overlap period either into the intake ports or directly into the combustion chambers. The effect is that the fuel is heated by the internally recirculated exhaust gases which pre-conditions the fuel to improve ignitability and combustion quality.

20 Claims, 1 Drawing Sheet

INTERNAL COMBUSTION ENGINE AND OPERATION THEREOF

FIELD OF THE INVENTION

The present invention relates to the fuelling of an internal combustion and application thereof to both gasoline and diesel engines.

BACKGROUND OF THE INVENTION

It has already been proposed to pre-condition fuel before it is injected into the combustion chambers of an engine by heating the fuel. Hitherto, this has been achieved using heat present in external EGR (exhaust gas recirculation) gases by injecting the fuel into an EGR pipe leading from the exhaust system to the intake system. This could only be achieved by means of additional equipment such as a fuel injector and a reaction chamber in the exhaust recirculation system.

SUMMARY OF THE INVENTION

A principal object of the present invention is to make use of processes that normally take place in conventional four stroke internal combustion engines to enhance fuel preparation and to produce more reactive radicals in the intake charge at the commencement of combustion in order to improve the ignitability of the fuel and air mixture.

According to one aspect of the present invention, there is provided a four stroke internal combustion engine in which, at least during certain pre-defined engine operating conditions, the intake and exhaust valves are open simultaneously to enhance internal exhaust gas recirculation (EGR) by forcing a substantial quantity of exhaust gases back into the intake ports, the engine having a fuel injection system with fuel injectors arranged in the intake ports, a variable valve timing system operative, at least during the said engine operating conditions, to prolong the valve overlap period when the intake and exhaust valves are simultaneously open, and a fuel control means for controlling the timing of the fuel injectors to introduce substantially all of the injected fuel directly into the back flow of internal EGR gases during the extended or prolonged valve overlap period, the fuel being thermally conditioned by the hot internal EGR gases before being admitted into the combustion chamber during the subsequent intake stroke.

In order to determine the optimum timing for port fuel injection, it has previously been attempted to vary the timing of fuel injection in relation to the operating cycle of the engine. By such experimentation, it has been determined that when the fuel is injected into the intake ports with the intake valves closed, the fuel is deposited on the hot walls of the intake ports and is heated and preconditioned before being drawn into the engine. This resulted in more reliable ignition and more complete combustion. When fuel is injected into the intake ports with the intake valves open, on the other hand, it has been found that the resulting combustion is not satisfactory because of poor mixing and less reliable ignition. In this case, the fuel has little time to be heated and is entrained by the intake air and deposited on the walls of the combustion chamber.

While attempting all possible injection timings, it is likely that it was attempted to inject fuel during the very brief valve overlap period. However, because this period is normally of much shorter duration than the fuel injection period, the advantageous effect achieved in the present invention has not previously been recognised. The important difference to note is that in the present invention special steps need to be taken to prolong the valve overlap period in order to ensure that substantially all of the injected fuel can be timed to be introduced into the hot EGR gases during the valve overlap period.

According to a second aspect of the present invention, there is provided a four stroke internal combustion engine in which, at least during certain engine operating conditions, the intake and exhaust valves are open simultaneously to enhance internal exhaust gas recirculation by forcing a substantial quantity of hot exhaust gases back into the intake ports, the engine having a fuel injection system with fuel injectors arranged in the combustion chambers, a variable valve timing system operative, at least during the said engine operating conditions, to prolong the valve overlap period when the intake and exhaust valves are simultaneously open, fuel control means for controlling the injection timing of the fuel injectors to introduce substantially all of the injected fuel directly into the residual gases in the combustion chambers during the extended valve overlap period, and pressure control means for creating a pressure drop from the exhaust ports towards the intake ports during the valve overlap period to ensure that the injected fuel does not pass out of the combustion chamber through the open exhaust valve, the fuel being thermally conditioned by the hot residual gases before the commencement of the subsequent intake stroke.

The second aspect of the invention differs from the first in that the fuel is injected directly into the combustion chambers rather than the intake ports. For this reason, it is necessary to take steps to control the pressures in the intake and exhaust ports to ensure that the injected fuel remains in the combustion chamber and is not allowed to escape through the open exhaust valve before it has been burnt.

In both its aspects, the present invention sets out to achieve thermal conditioning of the injected fuel by ensuring that it is heated by the hot burnt gases from the previous operating cycle before commencement of the subsequent intake stroke, thereby improving the ignitability of the fuel in the subsequent operating cycle. This can be used to achieve a more robust ignition during lean burn operation or to promote spontaneous ignition during low and medium load operation in order to reduce NOx emissions.

The means for ensuring sufficient pressure drop from the exhaust ports towards the intake ports may be an intake throttle for restricting the intake air flow and reducing the pressure in the intake ports. Alternatively the means may be an exhaust throttle for restricting the exhaust gas flow and increasing the pressure in the exhaust ports. As a further alternative, an intake throttle and an exhaust throttle may be used in combination.

The present invention is applicable to both gasoline and diesel fuels and is advantageous in promoting thermal pre-conditioning of the fuel by the hot residual gases retained in the cylinder thus improving the ignitability of the fuel when it is burnt in the immediately following engine cycle.

For a spark ignition engine, the lean burn capability of the engine can be significantly extended resulting in lower fuel consumption and lower exhaust emissions.

Under certain conditions, the fuel may be sufficiently preconditioned to undergo spontaneous ignition without relying on a spark when it is mixed with air and compressed during the immediately following compression stroke. This type of combustion, called active radical combustion (ARC) by Honda, premixed charge compression ignition (PCCI) by Toyota or homogeneous charge compression ignition (HCCI) by Southwest Research Institute, is different from the conventional gasoline type spark ignition or diesel type compression ignition in that the whole cylinder charge ignites spontaneously and simultaneously, resulting in ultra-low NOx emissions.

Further objects, features and advantages of the invention will become apparent from the following detailed description taken in conjunction with the accompanying figures showing illustrative embodiments of the invention.

BRIEF DESCRIPTION OF THE DRAWINGS

The invention will now be described further, by way of example, with reference to the accompanying drawings, in which.

DETAILED DESCRIPTION OF THE PREFERRED EMBODIMENT(S)

Figure 1:
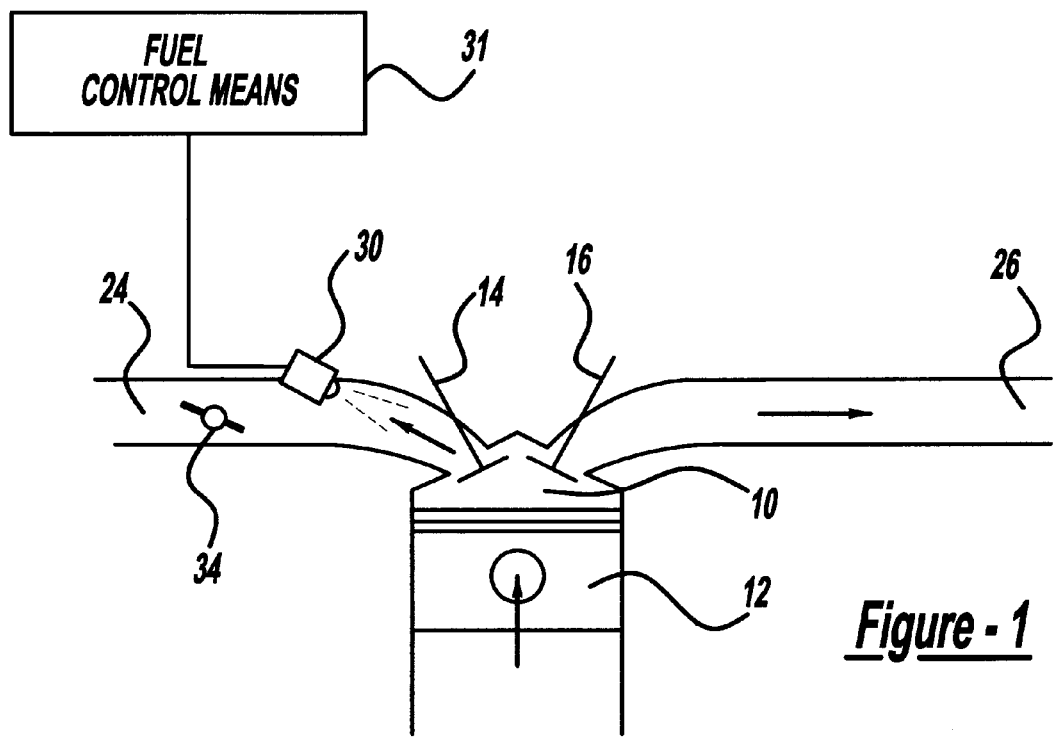
FIG. 1 is a schematic representation of an embodiment of the first aspect of the invention.

FIG. 1 shows a cylinder of a four stroke internal combustion engine having a piston 12 and a combustion chamber 10. Air is introduced into the combustion chamber through an intake pipe 24 having a butterfly throttle 34 and fuel is added to the intake air by means of a fuel injector 30 positioned to spray fuel into the intake port and coupled to a fuel control means 31. Gases are discharged from the combustion chamber 10 through an exhaust pipe 26. The intake and exhaust events are controlled by intake and exhaust valves 14 and 16 which are themselves acted upon by a variable valve timing system. The valve timing system may in its simplest form comprise separate camshafts for operating the intake and the exhaust valves and a phase shifting mechanism for advancing and retarding the two camshafts relative to one another and relative to the four stroke engine cycle.

Figure 2:
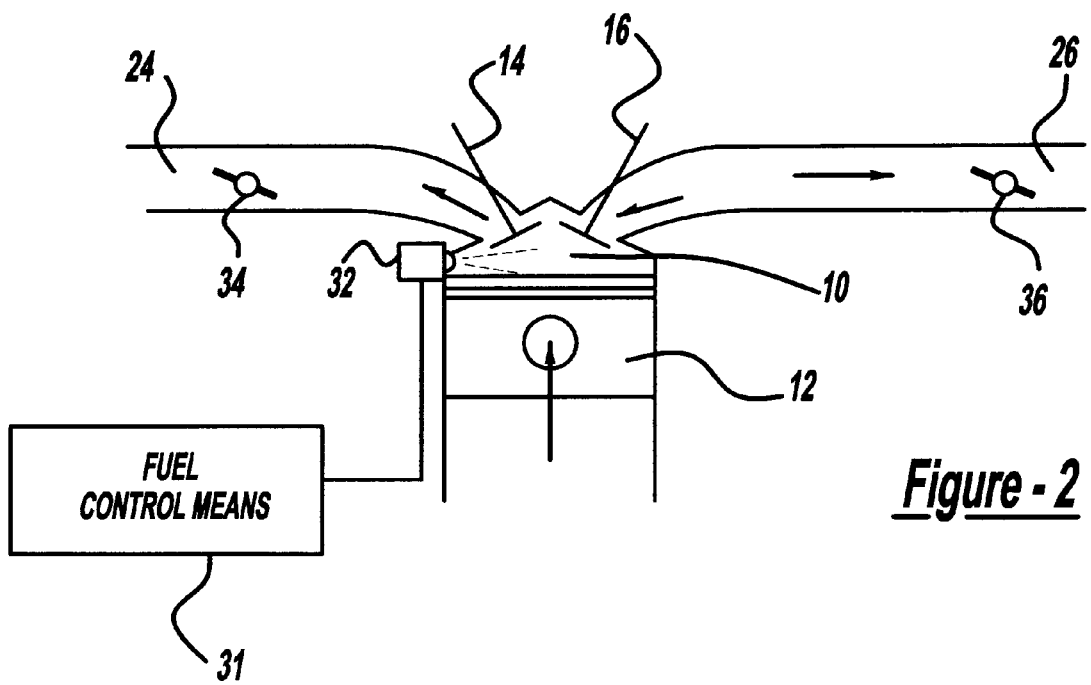
FIG. 2 is a similar view of an embodiment of the second aspect of the invention.

The embodiment of FIG. 2 is essentially the same as FIG. 1 and to avoid unnecessary repetition, like components have been designated by like reference numerals. The essential differences are that in place of the port fuel injector 30 there is an in-cylinder fuel injector 32, and a second butterfly throttle 36 is provided in the exhaust pipe in order to increase the exhaust back pressure.

In operation, during low and medium operation, the valve timing system of the engine is set to prolong the valve overlap period, that is to say the period, where as shown in the drawings, the intake valve 14 and the exhaust valve 16 are open at the same time while the piston 12 is moving towards its top dead center position. In the case of the embodiment of FIG. 1, the high pressure in the combustion chamber at the end of the previous cycle coupled with the low pressure in the intake port caused by the throttle 34 forces exhaust gases back into the intake port. In the invention, the fuel injector 30 is timed to open and inject fuel into the intake port at the time that the port is filled with the back flow of hot EGR gases which heat the fuel and precondition it. During the continuation of the intake stroke, these EGR gases are drawn back into the combustion chamber along with the fuel they contain, and fresh air is drawn in afterwards. Depending on the design of the intake system and the combustion chamber, the EGR gases containing the fuel can either be homogeneously mixed with the intake air charge, or kept separate if the charge is stratified.

In the embodiment of FIG. 2, the fuel is directly injected into the combustion chamber during the valve overlap period and there is a risk of some of the fuel escaping during the upstroke of the piston out of the open exhaust valve 16. To reduce or eliminate this tendency, it is possible to rely on the reduced pressure in the intake port that is caused by the throttle 34, but it is preferable additionally to increase the pressure in the exhaust port by partially closing the throttle 36 to increase the exhaust back pressure.

Although the present invention has been described in connection with particular embodiments thereof, it is to be understood that various modifications, alterations and adaptations may be made by those skilled in the art without departing from the spirit and scope of the invention. It is intended that the invention be limited only by the appended claims.

What is claimed is:

1. A four stroke internal combustion engine having at least one intake valve and a corresponding intake port, and at least one exhaust valve and a corresponding exhaust port, said engine comprising:

a fuel injection system having fuel injectors arranged in the intake port;

a variable valve timing system for simultaneously opening, at least during pre-defined engine operating conditions, the intake and exhaust valves so as to enhance internal exhaust gas recirculation (EGR) by forcing a substantial quantity of exhaust gases back into the intake port, said variable valve timing system being operative, at least during the engine operating conditions, to prolong a valve overlap period defined as the time during which the intake and exhaust valves are simultaneously open; and fuel control means for controlling the timing of said fuel injectors to introduce substantially all of the injected fuel directly into the back flow of the internal EGR gases during the prolonged valve overlap period, the fuel being thermally conditioned by the internal EGR gases before being admitted into the combustion chamber during a subsequent intake stroke.

2. The internal combustion engine according to claim 1, further comprising an intake throttle for restricting intake air flow and reducing pressure in the intake port.

3. The internal combustion engine according to claim 1, further comprising an exhaust throttle for restricting exhaust gas flow and increasing pressure in the exhaust port.

4. The internal combustion engine according to claim 1, wherein said engine is a spark ignition engine.

5. The internal combustion engine according to claim 1, wherein said engine is a compression ignition engine.

6. The internal combustion engine according to claim 5, further comprising means for preconditioning the fuel such that the fuel undergoes spontaneous ignition when mixed with air and compressed during an immediately following compression stroke.

7. A four stroke internal combustion engine having a combustion chamber, at least one intake valve and a corresponding intake port, and at least one exhaust valve and a corresponding exhaust port, said engine comprising:

a fuel injection system having at least one fuel injector arranged in the combustion chamber;

a variable valve timing system for simultaneously opening, at least during pre-defined engine operating conditions, the intake and exhaust valves so as to enhance internal exhaust gas recirculation (EGR) by forcing a substantial quantity of exhaust gases back into the intake port, said variable valve timing system being operative, at least during the engine operating conditions, to prolong a valve overlap defined as the time during which the intake and exhaust valves are simultaneously open;

fuel control means for controlling the injection timing of said fuel injector to introduce substantially all of the injected fuel directly into residual gases in the combustion chamber during the prolonged valve overlap period; and pressure control means for creating a pressure drop from the exhaust port towards the intake port during the prolonged valve overlap period to ensure that the injected fuel does not pass out of the combustion chamber through the open exhaust valve, the fuel being thermally conditioned by the residual gases before commencement of a subsequent intake stroke.

8. The internal combustion engine according to claim 7, further comprising an intake throttle for restricting intake air flow and reducing pressure in the intake port.

9. The internal combustion engine according to claim 7, further comprising an exhaust throttle for restricting exhaust gas flow and increasing pressure in the exhaust port.

10. The internal combustion engine according to claim 7, wherein said engine is a spark ignition engine.

11. The internal combustion engine according to claim 7, wherein said engine is a compression ignition engine.

12. The internal combustion engine according to claim 11, further comprising means for preconditioning the fuel such that the fuel undergoes spontaneous ignition when mixed with air and compressed during an immediately following compression stroke.

13. A method for operating an internal combustion engine having at least one intake valve disposed within a corresponding intake port, at least one exhaust valve disposed within a corresponding exhaust port, and at least one fuel injector disposed within the intake port, said method comprising:

opening, at least during pre-defined engine operating conditions, the intake and exhaust valves to force a substantial quantity of exhaust gases back into the intake port so as to enhance internal exhaust gas recirculation (EGR);

prolonging, at least during the engine operating conditions, a valve overlap period defined as the time during which the intake and exhaust valves are simultaneously open in accordance with said valve opening step; and controlling the injection timing of the fuel injectors to introduce substantially all of the injected fuel directly into the back flow of the internal EGR gases during the prolonged valve overlap period, whereby the fuel is thermally conditioned by the internal EGR gases before being admitted into a corresponding one of the combustion chambers during a subsequent intake stroke.

14. The method according to claim 13, further comprising:

restricting intake air flow; and reducing pressure in the intake port.

15. The method according to claim 13, further comprising:

restricting exhaust gas flow; and increasing pressure in the exhaust port.

16. The method according to claim 13, wherein said engine is a compression ignition engine and wherein said method further comprises the step of preconditioning the fuel such that the fuel undergoes spontaneous ignition when mixed with air and compressed during an immediately following compression stroke.

17. A method for operating an internal combustion engine having a plurality of combustion chambers, each of the combustion chambers having at least one fuel injector disposed therein and operating in cooperation with at least one intake valve disposed within a corresponding intake port, and at least one exhaust valve disposed within a corresponding exhaust port, said method comprising:

simultaneously opening, at least during pre-defined engine operating conditions, the intake and exhaust valves so as to enhance internal exhaust gas recirculation (EGR) by forcing a substantial quantity of exhaust gases back into said intake port;

prolonging, at least during the engine operating conditions, a valve overlap period defined as the time during which the intake and exhaust valves are simultaneously open in accordance with said valve opening step;

controlling the injection timing of the fuel injectors to introduce substantially all of the injected fuel directly residual gases in a corresponding one of the combustion chambers during the prolonged valve overlap period; and creating a pressure drop from the exhaust port towards the intake port during the prolonged valve overlap period to ensure that the injected fuel does not pass out of the corresponding one of the combustion chambers through the open exhaust valve, whereby the fuel is thermally conditioned by the residual gases before commencement of a subsequent intake stroke.

18. The method according to claim 17, further comprising:

restricting intake air flow; and reducing pressure in the intake port.

19. The method according to claim 17, further comprising:

restricting exhaust gas flow; and increasing pressure in the exhaust port.

20. The method according to claim 17, wherein said engine is a compression ignition engine and wherein said method further comprises the step of preconditioning the fuel such that the fuel undergoes spontaneous ignition when mixed with air and compressed during an immediately following compression stroke.

* * * * *